(12) United States Patent
Scheffer

(10) Patent No.: US 7,546,562 B1
(45) Date of Patent: Jun. 9, 2009

(54) PHYSICAL INTEGRATED CIRCUIT DESIGN WITH UNCERTAIN DESIGN CONDITIONS

(75) Inventor: Louis K. Scheffer, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 159 days.

(21) Appl. No.: 11/558,912

(22) Filed: Nov. 11, 2006

Related U.S. Application Data

(60) Provisional application No. 60/736,619, filed on Nov. 12, 2005.

(51) Int. Cl.
*G06F 17/50* (2006.01)
(52) U.S. Cl. .................. 716/4; 716/2; 716/6; 716/1
(58) Field of Classification Search ............... 716/4, 716/2, 6, 1
See application file for complete search history.

(56) References Cited

U.S. PATENT DOCUMENTS

| | | | |
|---|---|---|---|
| 7,395,516 B2 | 7/2008 | Fujimora et al. | |
| 2004/0243954 A1* | 12/2004 | Devgan et al. | 716/6 |
| 2005/0108674 A1* | 5/2005 | Darringer et al. | 716/18 |
| 2005/0278672 A1* | 12/2005 | Hosono et al. | 716/6 |
| 2006/0150129 A1* | 7/2006 | Chiu et al. | 716/4 |

FOREIGN PATENT DOCUMENTS

| | | |
|---|---|---|
| WO | WO 2004/059539 | 7/2004 |
| WO | WO 2006/127409 A2 | 11/2006 |
| WO | WO 2006/127538 A2 | 11/2006 |
| WO | WO 2009/003139 A1 | 12/2008 |

OTHER PUBLICATIONS

M. Orshansky, L. Milor, and C. Hu. Characterization of Spatial Intrafield Gate CD Variability, Its Impact on Circuit Performance, and Spatial Mask-Level Correction. Semiconductor Manufacturing, IEEE Transactions on, 17(1):2-11, Feb. 2004.

M. Orshanksy, L. Milor, P. Chen, K. Keutzer, and C. Hu. Impact of Spatial Intrachip Gate Length Variability on the Performance of High-Speed Digital Circuits. IEEE Transactions on Computer Aided Design of Integrated Circuits and Systems, pp. 544-553, 2002.

(Continued)

*Primary Examiner*—Stacy A Whitmore
*Assistant Examiner*—Magid Y Dimyan
(74) *Attorney, Agent, or Firm*—Alford Law Group, Inc.; Bill Alford

(57) ABSTRACT

In one embodiment of the invention, a physical integrated circuit (IC) design tool is provided including a design uncertainties file, a user interface (UI) software module, and a design analysis software module coupled to the UI software module, and the design uncertainties file. The design uncertainties file includes a plurality of predetermined IC design uncertainties. The UI software module communicates the plurality of predetermined IC design uncertainties to a user for selection and receives the selected IC design uncertainties from the user. The design analysis software module analyzes a circuit in response to the selected IC design uncertainties.

19 Claims, 10 Drawing Sheets

OTHER PUBLICATIONS

R. Venkatraman, R. Castagnetti, Kobozeva, F. Duan, A. Kamath, S. Sabbagh, M. Vilchis-Cruz. J Liaw, J.-C. You. and S. Ramesh. The Design, Analysis, and Development of Highly Manufacturable 6-T SRAM Bitcells for SoC Applications. Electron Devices, IEEE Transactions on, 52:218-226, Feb. 2005.

C. Visweswariah, K. Ravindran, K. Kalafala, S.G Walker, and S. Narayan. First-Order Incremental Block-Based Statistical Timing Analysis. in DAC '04: Proceedings of the 41st annual conference on Design automation, pp. 331-336, New York, NY, USA, 2004. ACM Press.

J. Yang, L. Capodieci, and D. Sylvester. Advanced Timing Analysis Based on Post-OPC Extraction of Critical Dimensions. in DAC '05: Proceedings of the 42nd annual conference on Design automation, pp. 359-364, New York, NY, USA, 2005. ACM Press.

B. Stine, D. Boning, J. Chung, D. Ciplickas, and J. Kibarian Simulating the Impact of Poly-CD Wafer-Level and Die-Level Variation On Circuit Performance. International Workshop on Statistical Metrology, 1997, pp. 24--27.

T. Ohtsuki, S.W. Director, and W. Maly. Advances in CAD for VLSI vol. 8; Statistical Approach to VSLI. Introduction to Design for Manufacturability of VLSI Circuits, by W. Maly. Statistical Simulation of Modern Industrial Fabrication Process, by P.K Mozumder, et al. Elsevier Science B.V. pp. 3-100 and 331-339. Amsterdam, The Netherlands, 1994.

L. Scheffer, L. Lavagno, and G. Martin. EDA for IC System Design, Verification, and Testing. EDA for IC Implementation, Circuit Design, and Process Technology. pp. 6:12-6:17, 19:1-19:23. Taylor and Francis Group, 2006. Boca Raton, FL, US.

\* cited by examiner

FIG. 2
| Effect | Use? | How? |
|---|---|---|
| Litho | ✓ | Sim |
| Etch | ✓ | Smpl Mdl |
| CMP | ☐ | |
| Dopant Fluc. | ✓ | Statistical |
| Intra-Chip | ☐ | |
| Chip-to-chip | ✓ | Fab A |
| Aging | ✓ | 10 year |
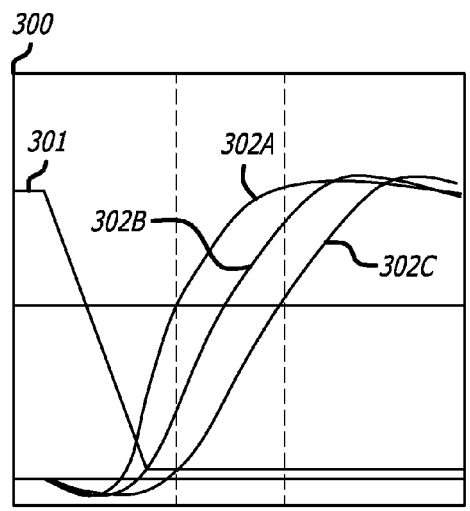
FIG. 3A
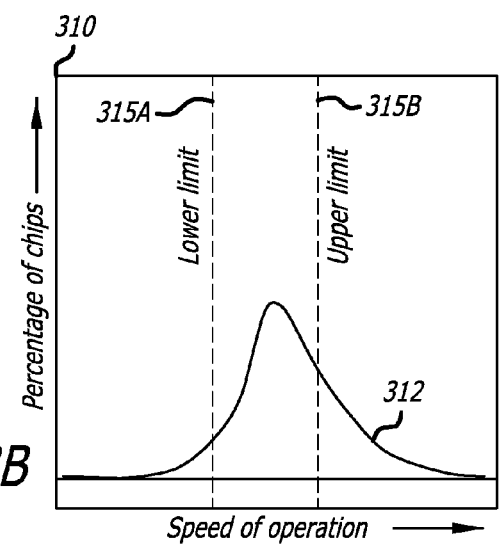
FIG. 3B

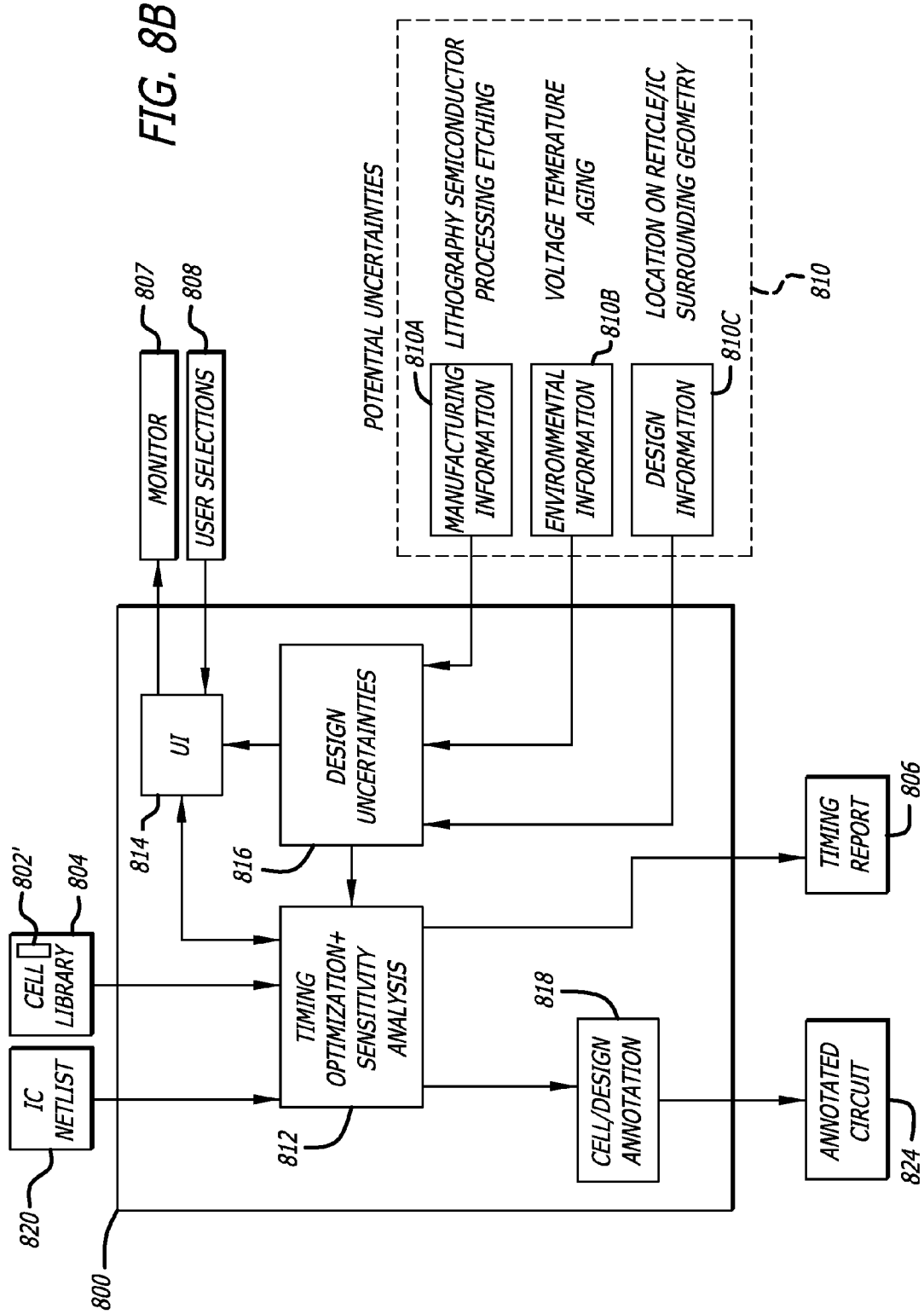

PHYSICAL INTEGRATED CIRCUIT DESIGN WITH UNCERTAIN DESIGN CONDITIONS

CROSS-REFERENCE TO RELATED APPLICATIONS

This non-provisional United States (U.S.) patent application claims the benefit of U.S. Provisional Patent Application No. 60/736,619 entitled "PHYSICAL INTEGRATED CIRCUIT DESIGN WITH UNCERTAIN DESIGN CONDITIONS" filed on Nov. 12, 2005 by Louis K. Scheffer, which is incorporated here by reference.

FIELD

The embodiments of the invention relate generally to electronic design automation (EDA) for integrated circuits. More particularly, the embodiments of the invention relate to statistical timing analysis of integrated circuits with consideration for uncertain design conditions.

BACKGROUND

Designing and manufacturing semiconductor integrated circuits is a challenge. There are a number of uncertainties in the design, manufacture, and end use of a semiconductor integrated circuit. It is desirable to consider a number of these uncertainties early in the design of the semiconductor integrated circuit to improve it.

BRIEF SUMMARY

The embodiments of the invention are summarized by the claims that follow below.

BRIEF DESCRIPTIONS OF THE DRAWINGS

FIG. 2 is a diagram illustrating an exemplary menu that may be presented to a user by a user interface by the embodiments of the invention.

FIGS. 3A-3B are exemplary results that may be generated and presented to a user by the embodiments of the invention.

FIG. 8B is a block diagram of the software modules of embodiments of the invention used to perform a design analysis in a second integrated circuit design flow.

DETAILED DESCRIPTION

Figure 1A:
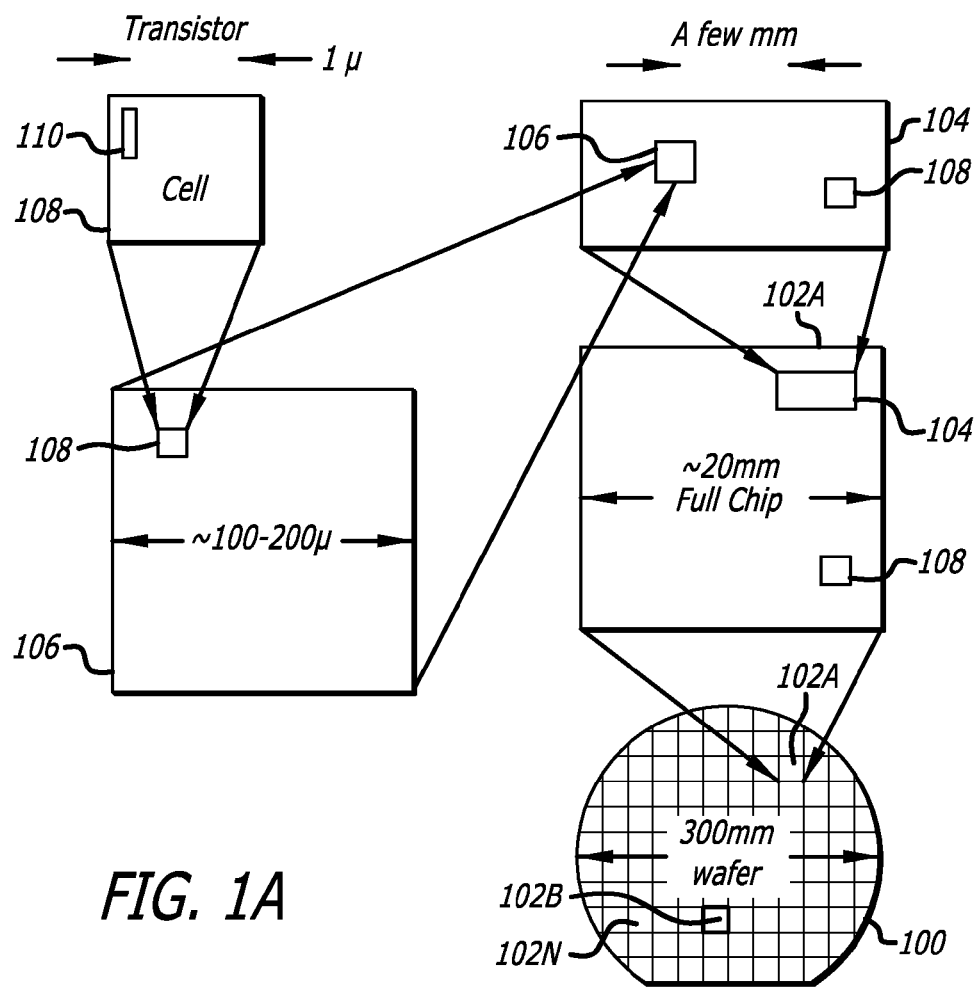
FIG. 1A is a diagram illustrating an exemplary hierarchy of an integrated circuit that is analyzed by the embodiments of the invention and stepped across a matrix of a wafer during its manufacture.

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention include a method, apparatus and system for the physical design of circuits within an integrated circuit chip. The embodiments of the invention generally employ an assume/verify process in an analysis of the physical design of integrated circuits.

While logical correctness in the design of an integrated circuit is very important, physically designing an IC to account for design uncertainties is also important. Prior approaches to handling uncertainties have not been integrated together, typically focusing on only a couple aspects of the design, manufacturing, or end use of the semiconductor integrated circuit.

Additionally, an IC designer previously had to be experienced and know of the uncertainties in order that they could be considered in the design. As the uncertainties exist in design, manufacturing and end use of a semiconductor integrated circuit, it is difficult for an IC designer to know of all possible uncertainties, determine which of those are relevant based upon the design and usage, and then consider how to include them in the design of an integrated circuit. As a result, one or more uncertainties may be overlooked or ignored in the design of an integrated circuit.

Typically, the sensitivities of standard logic cells to a local environment are managed by designing and analyzing the cells under nominal conditions and then adding guard bands to account for variation due to the actual environment into which the cells may be placed. The actual environment into which a cell may be placed is one ranging from high density logic circuitry to low density logic circuitry in which the parasitic resistive and capacitive loads may vary widely. A plurality of standard logic cells are combined together and guard banded to form standard cell libraries prior to placement with other cells into an integrated circuit and any routing there between. However, guard banding the cells leaves performance on the table, as each cell is assumed to be operating in a worst-case environment.

Designers of memory integrated circuits, such as DRAMs and SRAMs, have an advantage in that the environment into which their circuit cells are placed and used within an integrated circuit is known. The circuit cell being designed is embedded into a large array of identical circuit cells. These memory designers may use lithography simulation tools to account for the high density circuit environment in which the circuit cells are placed to manage one type of uncertainty. While the extra effort using lithographic simulation tools in designing a circuit cell is very large, it is tolerable because just a few circuit cell designs account for most of the area of these types of integrate circuit chips. Additionally, memory integrated circuits can be designed to include symmetric circuit strategies (such as dummy cells at the edges of arrays) to make the environment on the integrated circuit more uniform. However, these techniques are typically only useful for an array of the same circuit cell. Additionally, while the resulting circuit cells may be designed correctly in their intended context, this may never be confirmed with their usage in the overall layout of the integrated circuit or after manufacturing the integrated circuit into silicon or other semiconductor materials.

Analog IC designers have used design flows that first complete the entire analog IC design and then subjected the entire design to lithographic influences through a lithographic simulator ("litho sim"), then extracted parasitic capacitances and resistances and simulated the entire analog chip. However in this approach the overall IC design was known and completed before any lithographic influences were analyzed and it required that any hierarchy in the IC design be flattened into a flat design as the netlist output, because through the process each and every transistor is potentially unique. Digital IC designers have also tried the same general approach, but instead of creating a flat layout, have attempted to create location specific timing models of a standard circuit cell. However in either case, only one source of design uncertainty was considered and the additional steps in the design process were relatively slow, extending out the time to complete the design of the integrated circuit.

Some research has been performed on the variability of a design as a function of a cells position in the optical field. Circuit parameters were altered depending upon the cells placement in an integrated circuit, resulting in a flat, transistor level layout which was then simulated at the transistor level. However, this research focused on analyzing one specific source of uncertainty in a special way, requiring a flat layout or netlist.

Research in handling uncertainty has been considered in the area of statistical timing. However, this research typically has been focused on the issue of parametric yield. While parametric yield is important, there are other uncertainties that may be considered, many of which have little or no statistical components.

It is desirable in IC design to consider many uncertainties together. With the progression to smaller geometries and transistor devices, relatively larger uncertainties may be introduced. In addition, as process nodes shrink, all devices, intended and parasitic, show a larger dependence on their environment. Some of these uncertainties are: optical lithography, resist processing, material etching, chemical mechanical planarization (CMP), material deposition, operational use (e.g., temperature, voltage, age); environmental (e.g., circuit density); positional (e.g., horizontal, vertical, center, off-center, edge); location on the wafer; and properties of neighboring chips on the mask and wafer. Many of these depend on the wafer fab, that may be unknown, that is used to manufacture the integrated circuits on the wafers.

Referring now to FIG. 1A, a wafer 100 is illustrated with a plurality of integrated circuits 102A-102N formed therein in a matrix or rows and columns. FIG. 1A further illustrates a hierarchy of circuitry that may be used to define an integrated circuit 102A. Each complete integrated circuit ("full chip") 102A may include macro functional blocks 104 as well as lower level blocks and circuit cells. The macro functional blocks 104 for example may be processors, memory, or other types of functional blocks. The macro functional blocks 104 may be made of other smaller functional blocks 106 grouped together. The functional blocks 106, for example, may be registers, ALUs, control logic, random logic, or other types of functional blocks. The functional blocks 106 may be formed out of standard circuit cells 108 from a standard cell library.

A standard cell library typically includes a wide variety of types of standard circuit cells that provides basic low level functionality such as logic gates (e.g., AND, OR, XOR, INVERT, NAND, NOR, XNOR, BUFFER; multiplexer); basic storage logic (e.g., latch, flip flop, register, memory cell); input receivers, output drivers, and input/output buffers; tristate drivers; counters; etc. that are typically associated with an integrated circuit design. For each standard circuit cell in the standard cell library, information is provided regarding the cell dimensions, layers utilized, pin locations and layer, routing layers, and timing/delay information in a format that is known and read/writeable by IC CAD tools.

At a lowest level of an IC design and netlist are the active and passive electronic devices, such as transistors, resistors, and capacitors. Resistors and capacitors may be parasitic devices that were not intended to be a part of the design but are the result from manufacturing the semiconductor integrated circuit. One or more transistors 110 are typically used to form a standard circuit cell 108.

A plurality of the same standard circuit cell 108 may be used to form a functional block 106. For example, a set of sixteen D-type flip flop standard cells may be placed parallel to each other with control signals interconnected to form a sixteen bit register functional block. Alternatively, a mixture of types of standard circuit cells 108 may be combined to form a functional block. For example, a two bit adder may be formed of a combination of NAND, NOR, and INVERT standard cell circuits.

Uncertainty in a semiconductor integrated circuit may result from the matrix (row and column) position of an integrated circuit on the wafer. For example, the performance of integrated circuit 102B near the center of the wafer 100 may differ from the performance of integrated circuit 102A nearer the edge of the wafer 100. This may be referred to as a chip-to-chip uncertainty or effect.

Uncertainty in a semiconductor integrated circuit may also vary as a function of location within the integrated circuit die itself. For example, circuits that are placed near an edge of the integrated circuit die may have more defects and lower yield than circuits placed near the center of a die. As another example, a circuit placed in a crowded area of an integrated circuit may experience greater heating and provide lower performance than a circuit well spaced apart with a lower level of heating and a better performance. Uncertainty that is found within the integrated circuit itself to vary may be categorized as being an intra-chip uncertainty or effect. An intra-chip effect may be different at different locations of the same integrated circuit chip.

Figure 1B:
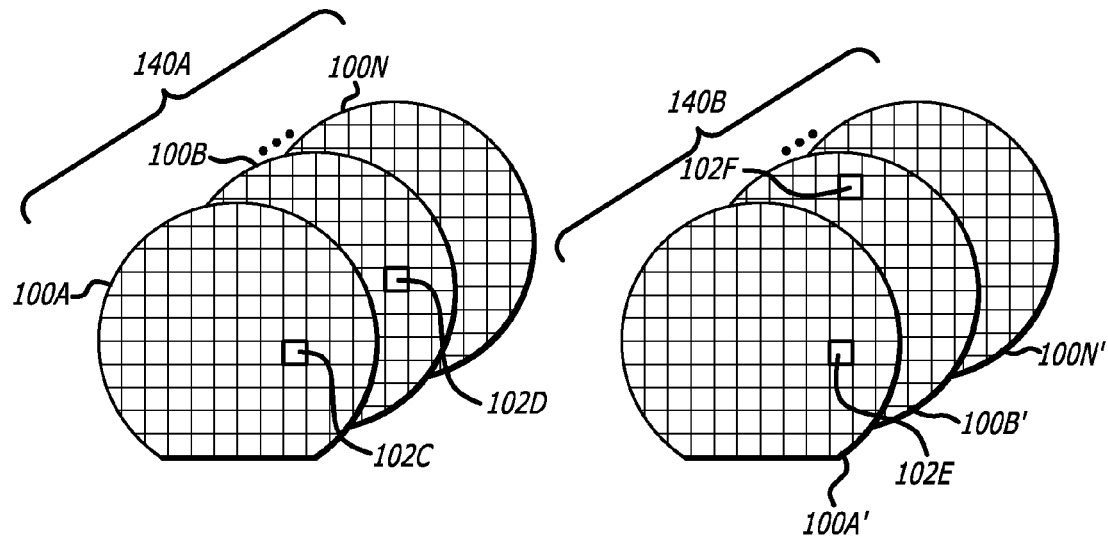
FIG. 1B is a diagram of a plurality of wafers in a pair of lots each including an integrated circuit design that is analyzed by the embodiments of the invention.

Referring now to FIG. 1B, a pair of manufacturing lots 140A-140B of wafers with the same integrated circuit design manufactured in a plurality of matrix positions is illustrated. Lot 140A includes N wafers 100A-100N. Lot 140B includes M wafers 100A'-100M'.

In addition to the matrix position, the uncertainty in the performance of an integrated circuit may vary from wafer to wafer and from manufacturing lot to lot. For example, the performance of integrated circuit 102C on wafer 100A may differ from the performance of integrated circuit 102D on wafer 100B even though they are in the same matrix position (same row, column position) on each. For example, the performance of integrated circuit 102C on wafer 100A in Lot 140A may differ from the performance of integrated circuit 102E on wafer 100A' in Lot 140B even though they are in the same matrix position (same row, column position) on each wafer. It may be the case that the performance of integrated circuit 102F on wafer 100B' will differ more from the performance of integrated circuit 102E on wafer 100A' because they are at different matrix positions and on different wafers.

The size of each fabricated geometry on a semiconductor IC depends on the local lithographic and etching environment.

A circuit cell may be placed horizontally or vertically within an integrated circuit with respect to the manufactured wafer. Because of the details of mask making technology, and optical exposures, this may cause a systematic channel length (L) dependence as a function of the cells orientation—horizontal or vertical.

The thickness of the metal and dielectric layers depends on the local chemical mechanical planarization (CMP) environment. A chemical mechanical planarization may be performed on one or more metal layers and the metal lines formed therein and/or dielectric layers reducing their thicknesses. A thinner metal signal line may generate a greater parasitic resistance and slow down signal transmission. A thinner metal power line may reduce its current carrying capabilities and result in a power failure. A thinner dielectric layer may result in increased parasitic capacitance between metal layers and the metal lines formed therein and reduce the speed of signal transmission.

Device and interconnect sizes may also depend on where in the optical field the device lies on the integrated circuit (an intra-chip variation).

Deposition and etching steps typically vary across a wafer's surface. Even with real time control, the thickness of a feature may only be exactly correct at one spot of a wafer.

The performance of circuits also depends on the supply voltages and ambient/junction temperatures, which vary during the operation of the integrated circuit chip.

The performance of the integrated circuit may change further during the operational life of the chip due to aging from slow material changes, such as electromigration of conductive layers (e.g., metal layers) or transistor degradation. Transistor degradation may occur from negative biased temperature instability (NBTI) of p-channel MOS field effect transistors (PFETs) or positive biased temperature instability (PBTI) of n-channel MOS field effect transistors (NFETs). Under NBTI, a positive charge builds up at the channel interface of the PFET transistors under negative bias and high temperature conditions (positive bias for NFETs). This results in a threshold voltage increase and a decrease in drain saturation current (IDsat) over time that may cause device instability and performance degradation.

Figure 1C:
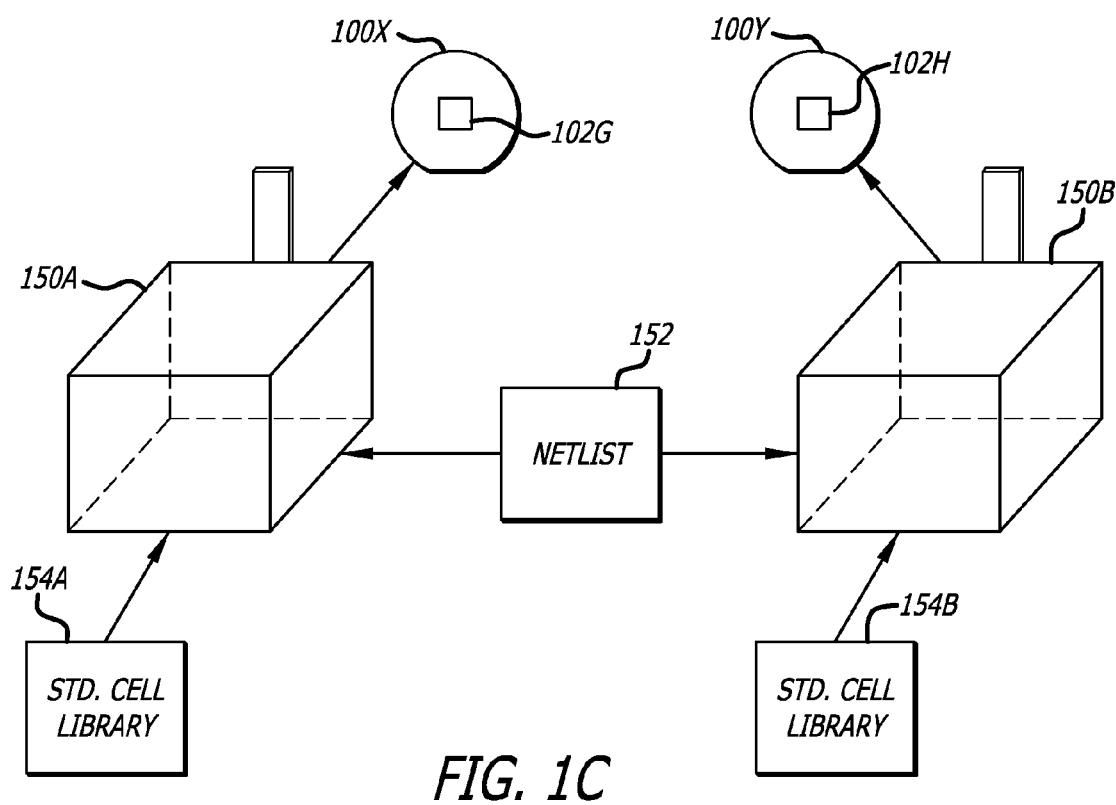
FIG. 1C is a diagram illustrating a pair of different wafer manufacturing facilities that may be used to manufacture an integrated circuit design that was analyzed by the embodiments of the invention.

Referring now to FIG. 1C, the integrated circuit design 152 is manufactured into silicon chips 102 across lots of wafers 100 in a manufacturing facility 150A-150B that may be referred to as a "wafer fab" or "fab". The fab 150A-150A in which the chip will be built may be unknown, and perhaps not yet constructed. Even if pre-existing, the wafer fab manufacturing performance and statistics may be time varying, such as from lot to lot or from wafer to wafer. Additionally, the IC design 152 may be manufactured in differing fabs 150A-150B so that the performance or the IC varies from fab to fab.

While the same IC design netlist 152, differing standard cell libraries 154A-154B may be used and provide performance variations. Even if the same standard cell library is used with the same IC design netlist, manufacturing differences in the fabs 154A-154B can cause variations in the performance of the integrated circuits 102G-102H from the respective wafers 100X-100Y manufactured in each.

Finally, there may be statistical variations, not predicted by any of the above factors.

Some of the factors causing uncertainties in the performance of integrated circuits may be known at design time (e.g., litho environment), some factors may be difficult to predict until the design is complete (e.g., CMP environment), some factors may vary during operation (e.g., temperature and voltage), some factors may not be known until years later (e.g., NBTI), and some factors may be currently beyond the control of an IC designer (e.g., position of the IC die on the wafer).

These uncertainties may be accounted for in the physical design of circuit cells and the overall integrated circuit by a new physical design tool. A new integrated circuit design tool and design flow is introduced to take uncertainty into account as an important (first-class) design objective. A designer fixes what is known, plugs in assumptions about what is not known (the uncertainties), and predicts the resulting performance. The assumptions used in the analysis are recorded, so they can be recalled if re-analysis or optimization is required, and checked to verify that the assumptions actually hold when the circuit design is used as part of a larger overall integrated circuit design. The uncertainties in design, manufacturing, and use of the semiconductor integrated circuit are presented in an integrated format to the designer so that they may considered at the same time and make it less likely the designer will overlook one or more of the uncertainties.

Designers have many possible ways of coping with uncertainties. They may try to try to control the uncertainty (as RAM designers do by including dummy rows and columns), or guardband against it, or change the design to be less sensitive. To make this decision correctly, they must be able to view and manipulate their metrics (typically power, yield, and area) and see how these are affected by the different strategies they might employ. The process of including/excluding various analyses is cumbersome, so this experimentation and analysis seldom gets done. Instead designers pick one approach and use it. By making selective analysis much easier, the embodiments of the invention encourage better decisions by designers.

After the designer finishes the analysis of a cell, all information about what uncertainties they planned for is currently lost. The embodiments of the invention store this information, which has a number of uses later. For example, if the analysis is to be repeated, perhaps with some minor variation, then the same (or very similar) assumptions should probably be used.

If automatic optimization is performed, it too will need to make a number of assumptions about the environment. Embodiments of the invention retain this information, so redundant entry is not required and errors are less likely.

Previously if an assumption about the physical environment was made during analysis, it typically was not checked during the actual usage of the circuit design. Thus a key assumption may in fact be violated, and make the original analysis possibly incorrect. Embodiments of the invention provide verification of assumptions made in the design analysis of the standard circuit cells compared against how the standard circuit cells are actually used in a larger circuit design of functional blocks and the full chip design.

Some analyses currently require specialized knowledge. For example, the analysis of possible lithography uncertainties requires a specialized knowledge. Embodiment of the invention will make it easier for a specialist to decide how such analysis should be done, and then the user can simply turn this portion of the analysis on or off.

The method starts with collecting in a single file or database data about the various sources of uncertainty that might affect an IC design.

Referring now to FIG. 2, an exemplary menu 200 is illustrated that may be presented to a user by a user interface. When a user performs an analysis of a circuit, the system asks the user which uncertainties should be included. This may be presented to the user in a form or menu of a list of the various uncertainties such as illustrated in FIG. 2. There are other ways to present to a user substantially the same choices that is functionally equivalent to a list or menu.

FIG. 2 illustrates an exemplary menu 200 listing various effects/uncertainties 202 (Litho, Etch, CMP, Dopant Fluct., Intra-Chip, Chip-Chip, Aging (NBTI, PBTI)) that may be selected by the user.

From these, the user selects from among these those that the user wants to consider for a particular analysis. A check box may be check off by a user under the "Use ?" column 203 to select the Effect/uncertainty that is to be considered.

For each Effect/uncertainty that is to be included, the user may select how it is to be considered by an available method, model, or level of detail in the analysis under the "How ?" column 204. For example, simulation (Sim); simple model (Smpl Mdl); statistical model (Statistical); manufacturing facility (Fab A); and expected lifetime (10 year). A popup menu may be used to provide the selectable choices as to how each effect/uncertainty may be considered.

When the analysis is done, the system records, along with a cell, the assumptions about which uncertainties were included and how they were considered in the analysis.

Referring now to FIGS. 3A-3B, through a user interface (UI), the results of the analysis may be presented to a user in different ways for different design objectives or metrics, such as timing, power, yield, and cost. The user interface may be a graphical user interface (GUI) to graphically present results and objects for selection, a text user interface to textually present results and objects for selection, or a combination graphical and text based user interface.

In FIG. 3A, the results of a timing analysis of an inverter, for example, are presented in the form of a graph 300 of input and output waveforms 301,302A-302C. A best case waveform 302A, a nominal case waveform 302B, and a worst case waveform 302C may be generated by the timing analysis for the selected uncertain effects. Timing values of the waveforms, such as rise time, fall time, and input/output delay time may additionally be computed, provided to the user through the UI and stored with the cell, circuit, or functional block.

Alternatively, the sensitivity or odds that a specified parameter or design objective of a circuit is within a range of limits may be analyzed and reported to the user. In FIG. 3B, the results of the sensitivity or odds of a circuit in meeting a speed of operation are presented in the form of a graph 310 with a probability waveform 312 indicating the percentage of chips that meet the speed of operation or timing goal. A yield of chips between a range of a lower limit 315A and an upper limit 315B may be computed and presented to the user through the UI and stored with the cell, circuit, or functional block. For example if the range is between 35% and 55% of a speed of operation, the percentage of chips meeting this range may be 99% for example.

For any additional analysis of the cell, the system uses the stored assumptions as the starting point. The details of the analysis, and which effects are included, may be modified as above.

For automatic optimization of a design, the optimization software may use the stored assumptions, as in the above steps.

When a cell is used as part of a larger design, the system looks at the actual usage, and compares to the assumptions (if any) that were made when the cell was analyzed. If they differ, a warning or error is generated.

The features of embodiments of the invention include:
A file or database containing the master list of possible uncertainties, even though they are of different sources and analyzed by different means.

Presenting to the user in a form or menu a list of the various uncertainties.

Selecting from among these those that the user wants to consider for a particular analysis From the uncertainties that are to be included, selecting the method of analysis.

Recording, with a cell, the assumptions about which uncertainties were included in the analysis.

For additional analysis of the cell, using the stored assumptions as the starting point.

For optimization, using the stored assumptions to specify the environment.

When a cell is used, verifying the actual usage to make sure it satisfies the stored assumptions, if any.

Figure 4:
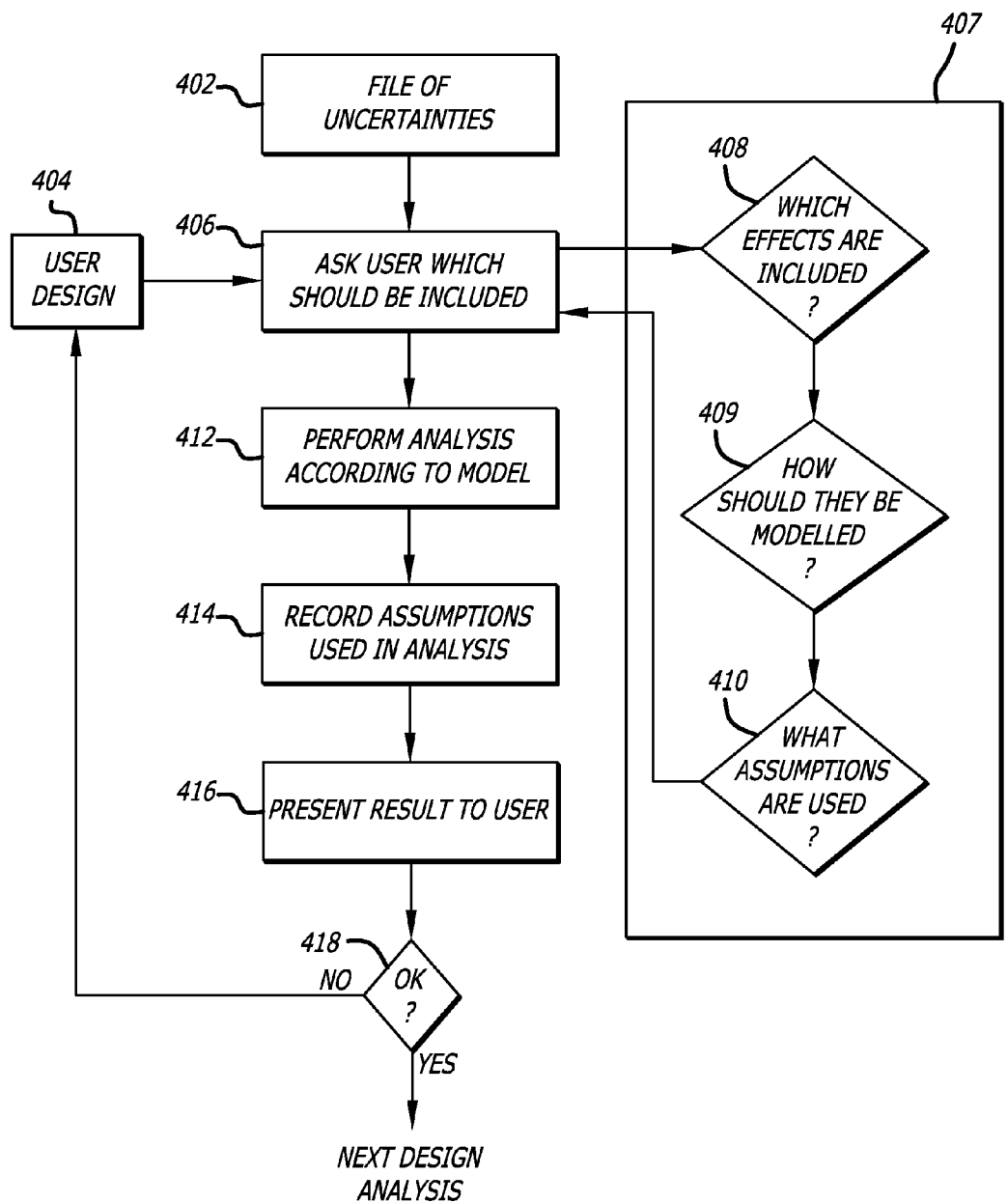
FIG. 4 is a flow chart of a method performed by embodiments of the invention.

Referring now to FIG. 4, various sources of uncertainty that might affect an IC design are collected into a single file or database 402. As new effects or information of design uncertainty are determined, they may be included into the uncertainty file or database 402 for presentation to the IC designer for consideration.

The uncertainty file or database 402 may be stored in a general file format such as XML, a proprietary file format, or stored in a database. There are other ways to store substantially the same information that is functionally equivalent to a file or database. Many possible formats can be used to represent information in the embodiments of the invention.

The effect/uncertainty data stored typically will have a name for each effect, a range of variation, the type of distribution to be assumed (typically uniform or Gaussian), the type of analysis desired (e.g., worst case, statistical, etc.), and any other information needed to account for this source of uncertainty in a specific or generic process.

With the effect/uncertainty data for IC design stored into the uncertainty file or database 402, the software tool may be executed to perform various analysis at different stages of an IC design.

In FIG. 4, a user may be working on a new physical design 404 of a standard circuit cell or a custom circuit and wishes to analyze it.

At block 406, the ECAD software system first asks the user which uncertainties should be included by presenting the information of the uncertainty file or database 402 to him/her and various selections are made by the user. The uncertainty file or database 402 may be presented to the user in a form or menu 407 of a list of the various uncertainties.

At block 408, the user selects from among these those that the user wants to consider for a particular analysis. At block 409, for each uncertainty that is to be included, the user may select the method or level of detail of the analysis. At block 410, for each uncertainty that is not to be included, the user can specify the reasons/assumptions that are made for dismissing or excluding this effect/uncertainty. (For example, if a cell is only to be used once, and the litho environment is known, then litho uncertainty may be dismissed and may be excluded from the design analysis.) A user may also specify the reasons/assumptions that are made for including the selected effects/uncertainties.

Next at block 412, the design analysis is performed, including each selected source of uncertainty, and analyzing it according to the method/model specified.

At block 414, when any design analysis is done, the software system records, along with the design, the effects/uncertainties which were included and excluded in the analysis, how they were modeled, and the assumptions made for inclusion and/or exclusion of the effects/uncertainties in the analysis. By saving this information together with the cell design in the same file, the circuit cell design may be referred to as being an annotated circuit cell.

At block 416, the results of the design analysis are presented to the user through a user interface.

At block 418, the user decides whether or not the results of the design analysis are satisfactory. If the results are not acceptable, the user may elect to go back to redesign the physical design or specification of the standard circuit cell or custom circuit at block 404 and then repeat the design analysis of blocks 406-416. If the results are acceptable, the user may save the design of the standard circuit cell or custom circuit for later use as a portion of a larger design.

Figure 5:
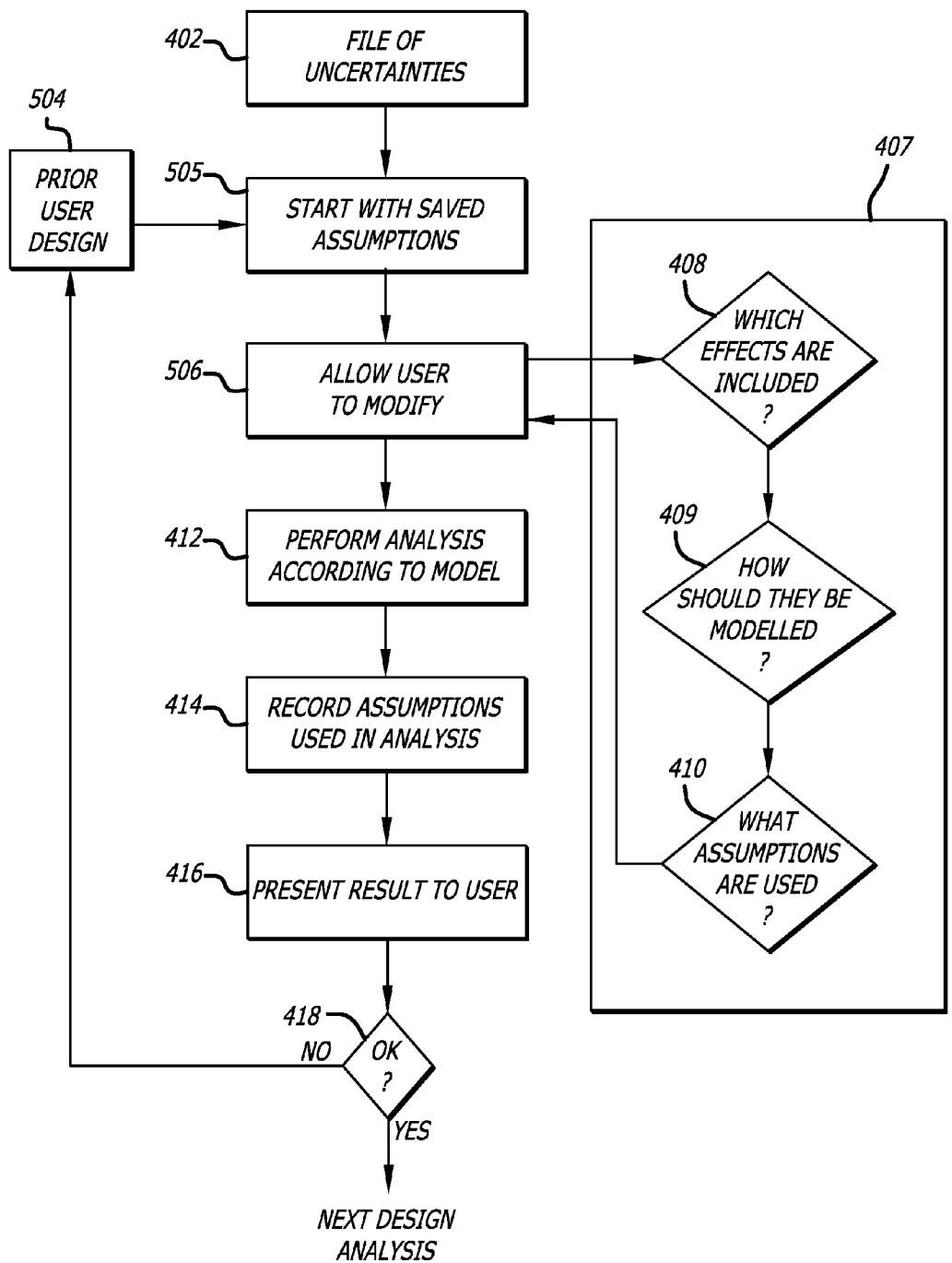
FIG. 5 is a flow chart of a method performed by embodiments of the invention.

Referring now to FIG. 5, a user may return to a prior circuit design 504 that was previously analyzed by the design software. The user may desire to make changes or modify the prior circuit design 504 or optimize it further according to design goals or objectives.

At block 505, the software system reads the prior circuit design 504 and the saved selected uncertainties and assumptions made for their inclusion/exclusion that are annotated thereto.

At block 506, the user interface of the software system may present the details of the prior design analysis including the results (FIG. 3A or FIG. 3B) and which effects/uncertainties were previously included/excluded, models, and assumptions to the user. The previously included/excluded effects/uncertainties, models, and assumptions may be modified by the user, if desired. The may be modified in accordance to blocks 407-410 described previously with reference to FIG. 4, the description of which is incorporated here by reference. Otherwise, the same previously included/excluded effects/uncertainties, models, and assumptions may by the used in the design analysis of the prior circuit design 504 by the software system. In which case, the prior circuit design 504 may have been modified, or if not, the prior design analysis may be similar.

Blocks 414, 416, and 418 are then performed by the software system with the prior circuit design 504. The detailed description of blocks 414, 416, and 418 previously described with reference to FIG. 4 is incorporated here by reference.

Figure 6:
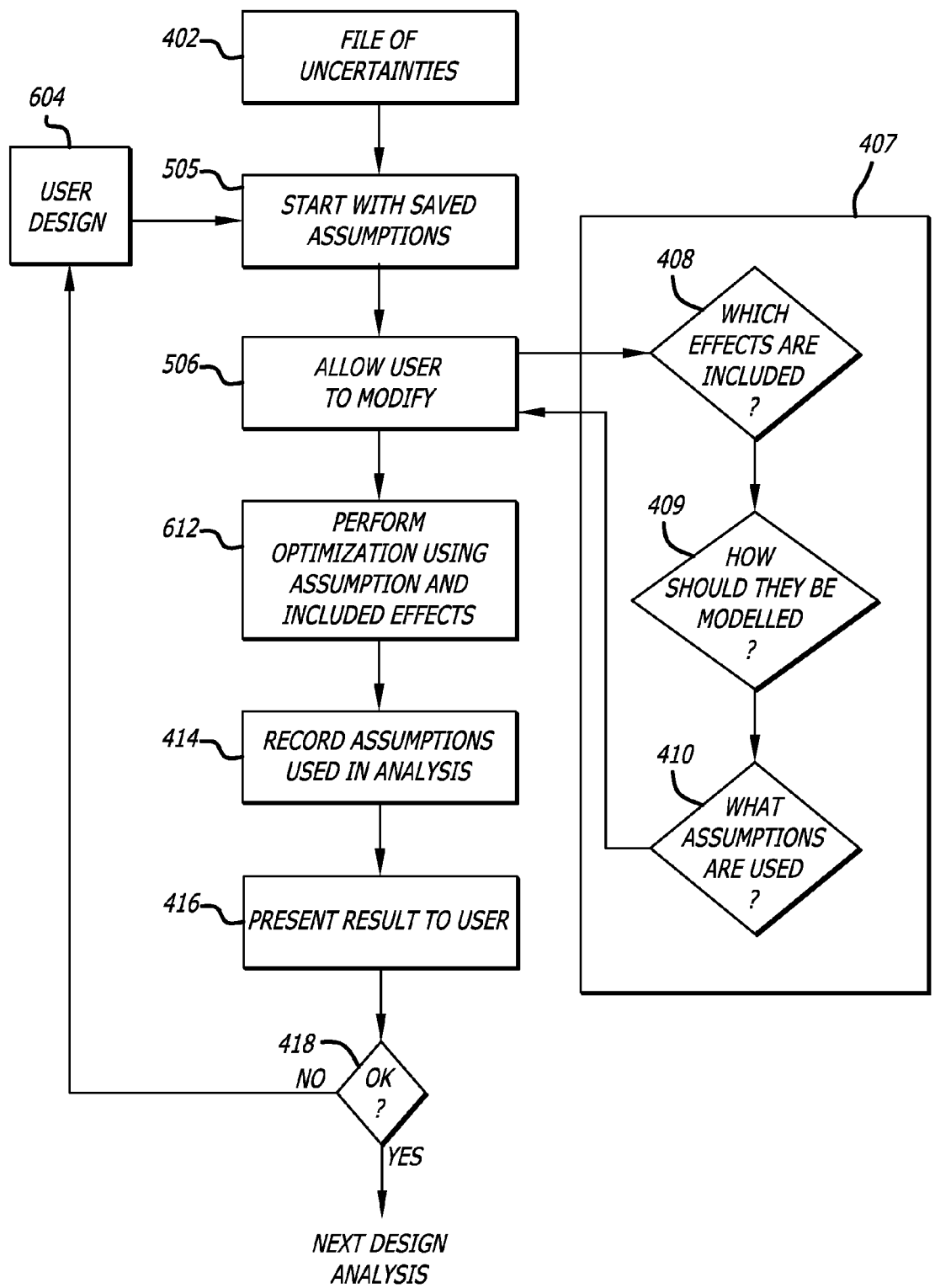
FIG. 6 is a flow chart of a method performed by embodiments of the invention.

Referring now to FIG. 6, to automatically optimize a circuit design 604, the software system may include an optimization software module. The optimization software can use stored included/excluded effects/uncertainties, models, and assumptions that are annotated to the circuit design to perform an optimization of it. The circuit design 604 may be a new design or a prior design that is to be optimized.

At block 505, the software system reads the prior circuit design 504 and the saved selected uncertainties and assumptions made for their inclusion/exclusion that are annotated thereto.

At block 506, the user interface of the software system may present the details of the prior design analysis of the circuit design 604 including the results (FIG. 3A or FIG. 3B) and which effects/uncertainties were previously included/excluded, models, and assumptions to the user.

The previously included/excluded effects/uncertainties, models, and assumptions of the design 604 may be modified by the user, if desired. They may be modified in accordance to blocks 407-410 described previously with reference to FIG. 4, the description of which is incorporated here by reference. Otherwise, the same previously included/excluded effects/uncertainties, models, and assumptions may by the used in the optimization analysis of the circuit design 604 by the software system.

At block 612, the optimization software module of the system software uses the specified included/excluded effects/uncertainties, models, and assumptions during the optimization process of the circuit design 604.

Blocks 414, 416, and 418 are then performed by the software system with the circuit design 604 for the optimization analysis. The detailed description of blocks 414, 416, and 418 previously described with reference to FIG. 4 is incorporated here by reference.

A standard circuit cell or custom circuit was previously described as being analyzed by the software system to consider effects/uncertainties in its design and to optimize the circuit to one or more predetermined design goals. However, the software system may also analyze larger circuit designs and include new designs of a standard circuit cell or custom cell or modifications thereto.

Figure 7:
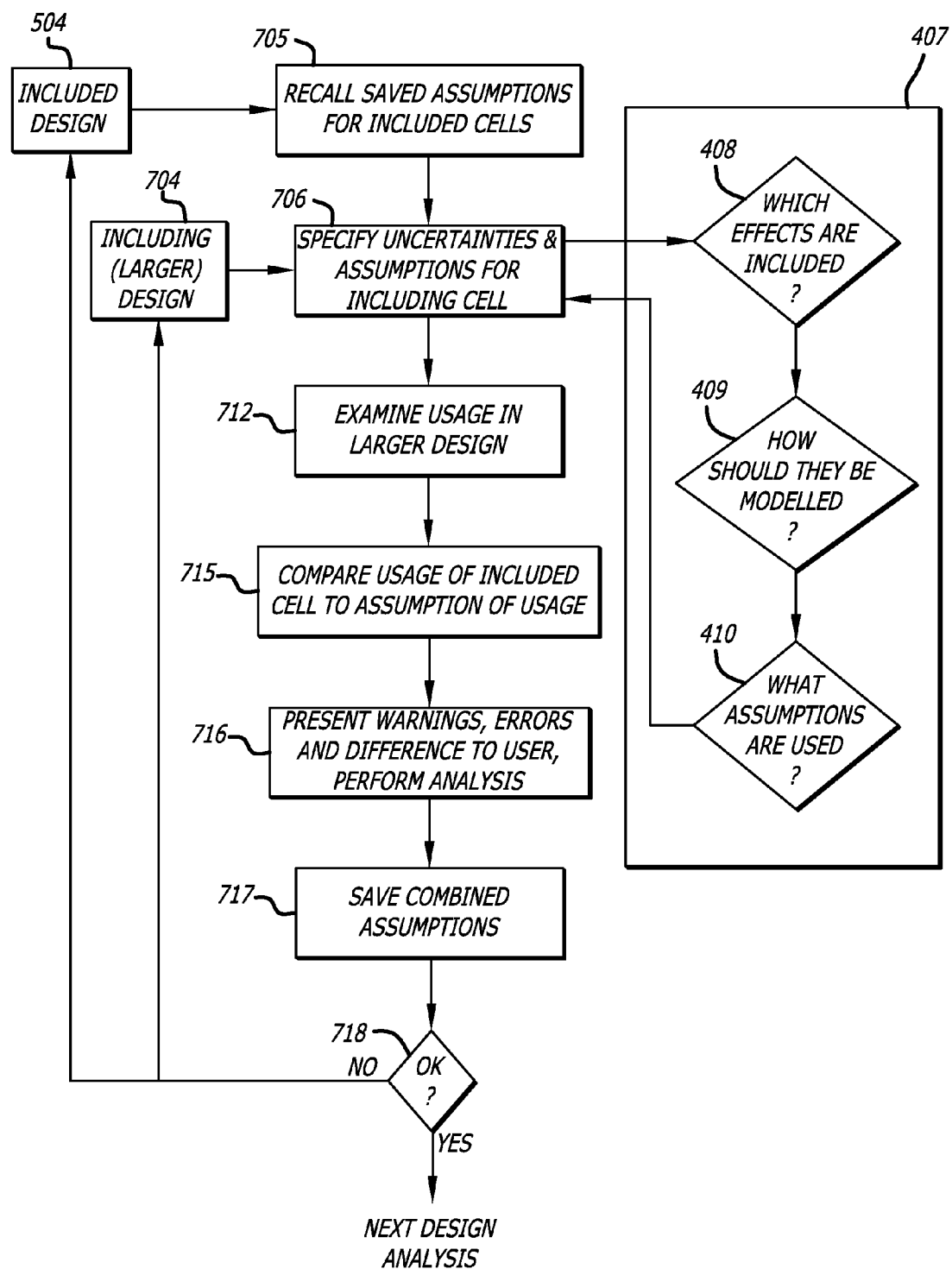
FIG. 7 is a flow chart of a method performed by embodiments of the invention.

Referring now to FIG. 7, a user includes one or more previously analyzed circuit designs 504 (see description of FIGS. 4-6) into a larger design 704 (such as a functional block, macro block, or full IC chip) for analysis. The larger circuit design 704 may then be analyzed with the one or more prior analyzed circuit designs 504, either automatically or by user request.

At block 705, the software system recalls the assumptions that were made during the analysis of the included design(s) 504.

At block 706, the software system allows the user to specify the desired analysis, included/excluded effects/uncertainties, models, and assumptions used in the larger circuit design 704 that is to include the prior analyzed circuit designs 504. These are specified in accordance to blocks 407-410 described previously with reference to FIG. 4, the description of which is incorporated here by reference.

At block 712, the software system looks at the actual usage(s) of the included design(s). That is, the placement, routing, etc. of the circuits cells 504 is examined in the larger circuit design 704.

At block 715, the software system compares the assumptions (if any) to the actual usage(s) of the circuit cells 504. That is, the desire assumptions, effects/uncertainties, models made for the prior analyzed circuit cells 504 is compared with how the one or more cells are actually used in the larger circuit design 704 and the assumptions that are being made with respect to its analysis.

At block 716, for each and every included circuit design 504, if the assumptions, effects/uncertainties made in the prior analysis of the circuit cells 504 differs from how it is to be used in the larger design 704, a warning or error is generated and the differences are presented to the user. In this manner, the IC designer knows that the prior assumptions made with the analysis of the circuit cells 504 differs from how the cells are actually used in the larger circuit design 704.

A design analysis of the larger circuit design 704 is also made to determine timing, power, yield, and/or costs of the larger circuit design 704 that includes the one or more cells 504. A design optimization may also be made on the larger circuit design 704 that includes the cells 504.

At block 717, the software system saves the combined assumptions made for the larger circuit design 704 and the one or more prior analyzed circuit cells 504 that are included in the larger circuit design 704.

Then at block 718, the user decides whether or not the results of the design analysis are satisfactory. If the results are not acceptable, the user may elect to go back to redesign the physical design of the standard circuit cell 504 or the design of the larger circuit design 704 and how the standard circuit cells 504 are utilized. The design analysis of blocks 705-706, 712, and 715-718 may then be repeated. Otherwise if the results are acceptable, the user may save the design of the larger circuit 704 and the standard circuit cells 504 for later use as a portion of a still larger design.

Figure 8A:
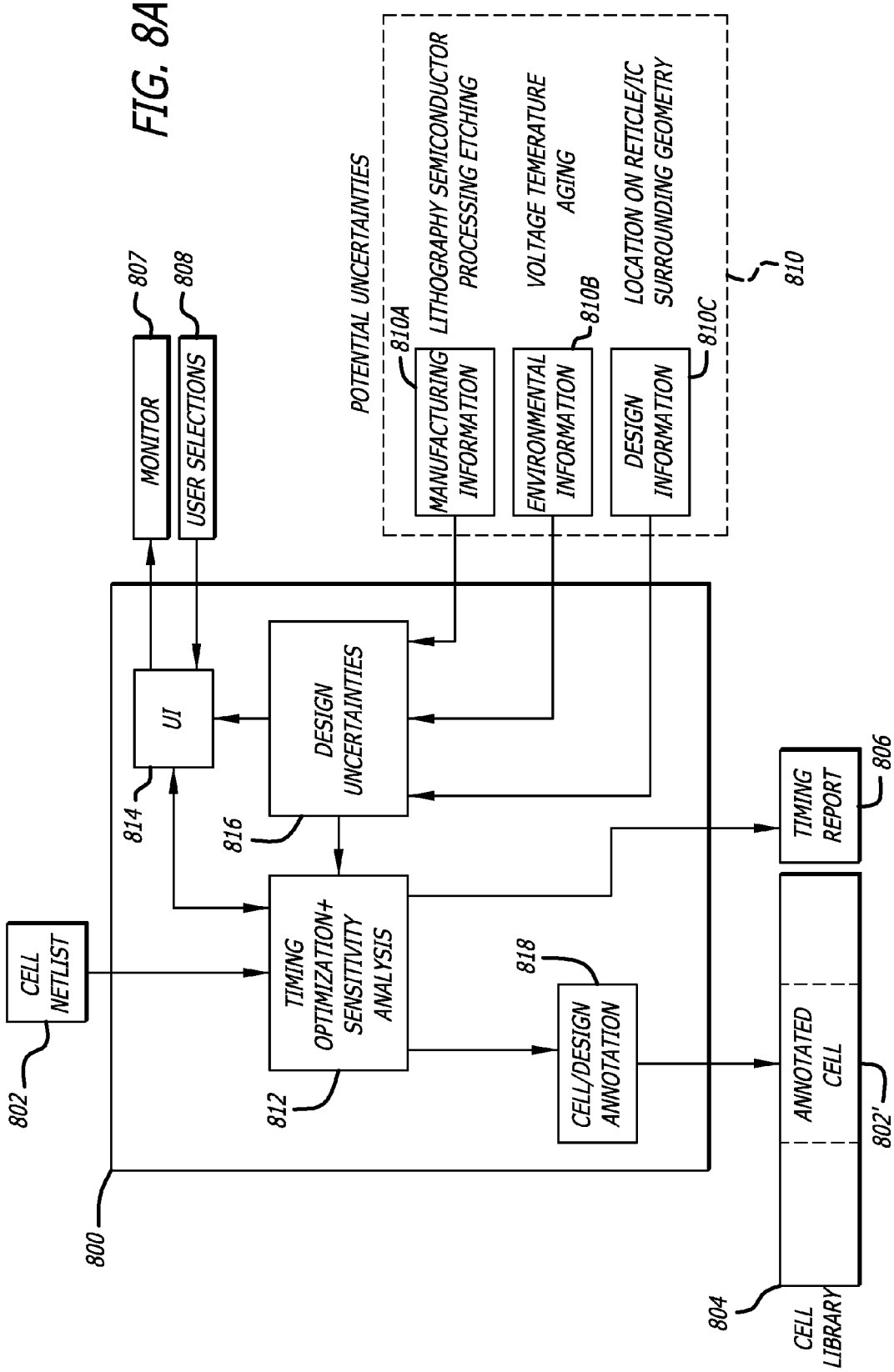
FIG. 8A is a block diagram of the software modules of embodiments of the invention used to perform a design analysis in a first integrated circuit design flow.

Referring now to FIG. 8A, a physical IC design tool 800 and its input/output information is illustrated. The physical IC design tool 800 has a number of software modules including a timing, optimization, and sensitivity analysis software module 812, a user interface (UI) software module 814, a design uncertainties file or database 816, and a cell/design annotation software module 818 to communicate together as shown.

Potential design uncertainties 810 are gathered together to form the design uncertainties file or database 816 that can be presented to a user through the UI 814 that drives a monitor 807. The potential design uncertainties 810 may include integrated circuit manufacturing information (e.g., lithography, semiconductor processing, etching) 810A for one or more wafer fabs; environmental information (e.g., voltage, temperature, aging) 810B; and design information (e.g., Reticle/IC location, surrounding geometry) 810C. The potential design uncertainties 810 that may be gathered together into the design uncertainties file or database 816 were previously described in greater detail.

The design uncertainties file or database 816 is communicated to the UI 814 to present the potential design uncertainties o a user through the monitor 807. The design uncertainties file or database 816 is also communicated to the analysis software module 812 to perform a design analysis considering the selected design uncertainties from the file or database 816.

The UI 814 communicates data to the monitor 807 to generate a display of information to a user, such as the exemplary menu 200 or the waveform results illustrated in FIGS. 2 and 3A-3B, respectively. The UI 814 receives user inputs or selections 808 in response to the display of information provided to the user. The UI 814 communicates the user selections 808 to the analysis software module 812 to perform the desired type of design analysis and consider the selected design uncertainties from the file or database 816.

The analysis software module 812 receives a circuit cell netlist 802 to analyze that may be new and not analyzed previously (such as the new physical design 404 of a standard circuit cell or a custom circuit illustrated in FIG. 4 and described previously) or that may have been previously analyzed (such as the prior circuit design illustrated in FIG. 5 and described previously). In response to the user selections 808, the analysis software module 812 performs the desired type of design analysis on the cell netlist 802 considering the selected design uncertainties from the file or database 816. The analysis software module 812 communicates results of the analysis to a user through the UI 814 and may also generate a printed report 806 of the results that may be printed out on a printer.

Additionally, the analysis software module 812 communicates the cell netlist 802, the selected design uncertainties from the file or database 816, and results of the analysis to the cell/design annotation software module 818. The cell/design annotation software module 818 combines the cell netlist 802, the selected design uncertainties, and the results together into an annotated cell 802'. A plurality of cell netlists 802 of different logic types and strengths may be analyzed and annotated to form a cell library 804 for use in larger functional blocks, a full integrated circuit chip, as well as other levels of hierarchy of the integrated circuit.

With the input information (cell netlist 802, user selections 808, uncertainties 810) provided to the physical IC design tool 800 illustrated in FIG. 8A, the methods illustrated in FIGS. 4-6 may be performed by the software modules of the physical IC design tool 800.

Referring now to FIG. 8B, the physical IC design tool 800 receives other input information (IC netlist 820, cell library 804, user selections 808, potential uncertainties 810) so that the method illustrated in FIG. 7 may be performed by the software modules of the physical IC design tool 800.

Instead of receiving a single circuit cell netlist 802, the analysis software module 812 receives a cell library 804 with a plurality of annotated circuit cell netlists 802' and an integrated circuit (IC) netlist 820 of a larger functional block or full chip that uses one or more of the plurality of annotated circuit cell netlists 802' in the cell library as part of its functional logic.

The analysis software module 812 analyzes the actual use (e.g., placement) of the annotated circuit cells 802' within the IC netlist 820 as to whether or not the design uncertainties made for the analysis of the annotated circuit cells 802' is in conformance or differs from how the cells are being used. If it differs, the analysis software module 812 generates an error or warning that is presented to the user through the UI 814.

The analysis software module 812 also can perform a physical design analysis of the IC netlist 820 with the instances of the annotated circuit cells 802' from the cell library 804. In response to the user selections 808, the analysis software module 812 performs the desired type of design analysis on the IC netlist 820 considering the selected design uncertainties from the file or database 816. The analysis software module 812 may communicate results of the analysis to a user through the UI 814 and may also generate a printed report 806 of the results that may be printed out on a printer.

Additionally, the analysis software module 812 communicates the IC netlist 820, the selected design uncertainties from the file or database 816, and results of the analysis to the cell/design annotation software module 818. The cell/design annotation software module 818 may combine the IC netlist 820, the selected design uncertainties, and the results together into an annotated circuit 824. Other IC netlists 820 may be analyzed and annotated to form still larger functional blocks or a full integrated circuit chip analysis may be performed.

Figure 9:
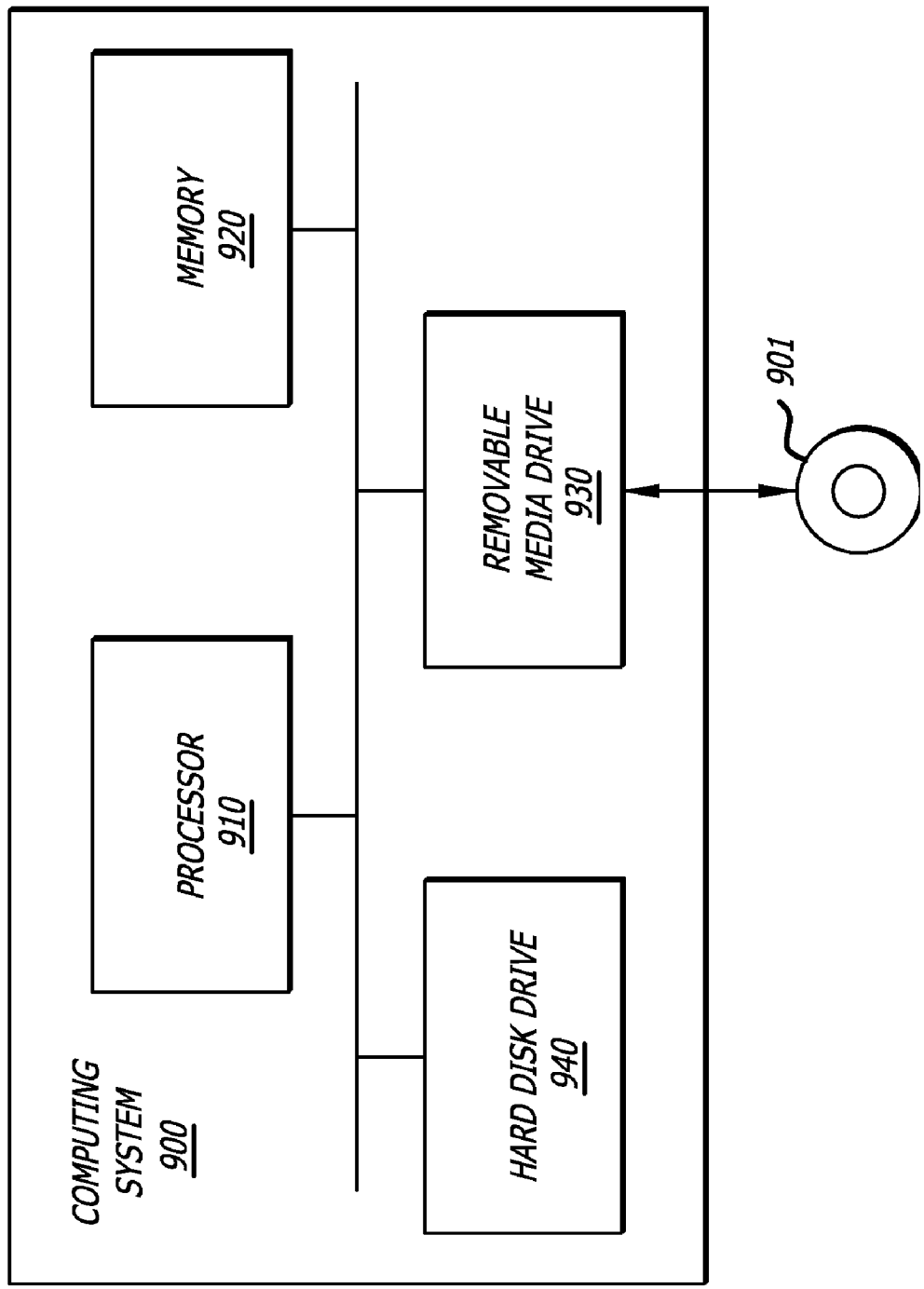
FIG. 9 illustrates an exemplary embodiment of a computing system usable with embodiments of the invention.

Referring now to FIG. 9, a computing system 900 is illustrated that may be used to perform some or all of the processes in accordance with a number of embodiments of the invention. In one embodiment of the invention, the computing system 900 includes a processor 910, a memory 920, a removable media drive 930, and a hard disk drive 940. In one embodiment, the processor 910 executes instructions residing on a machine-readable medium, such as the hard disk drive 940, a removable medium 901 (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 920, which may include Random Access Memory (RAM), dynamic RAM (DRAM), etc. The processor 910 may retrieve the instructions from the memory 920 and execute the instructions to perform the operations described above.

Note that any or all of the components and the associated hardware illustrated in FIG. 9 may be used in various embodiments of the system 900. However, it should be appreciated that other configurations of the system 900 may include more or less devices than those shown in FIG. 9.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or computing or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the embodiments of the invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The embodiments of the invention are thus described. While embodiments of the invention have been particularly described, they should not be construed as limited by such embodiments, but rather construed according to the claims that follow below.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

What is claimed is:

1. A physical integrated circuit (IC) design tool for analyzing an IC design, the design tool comprising:
    instructions of one or more software modules stored in a storage device and executable by a processor, the instructions of the one or more software modules including instructions for
    a user interface (UI) software module
        to read a design uncertainties file including a plurality of predetermined IC design uncertainties, wherein the plurality of predetermined IC design uncertainties of the design uncertainties file includes at least two of the set of lithography, semiconductor processing, etching, chemical-mechanical polishing, dopant fluctuations, placement, orientation, surrounding geometry, Intra-Chip positional, Chip-to-Chip positional, operational, voltage, temperature, and aging,
        to communicate the plurality of predetermined IC design uncertainties to a user for selection, and
        to receive one or more user-selected IC design uncertainties from the user;
    and
    a design analysis software module in communication with the UI software module to receive the one or more user-selected IC design uncertainties, the design analysis software module to analyze a circuit in response to the one or more user-selected IC design uncertainties.

2. The physical integrated circuit (IC) design tool of claim 1, wherein the instructions of the one or more software modules further includes instructions for
    a design annotation software module to annotate the circuit with the selected IC design uncertainties and results of the design analysis.

3. The physical integrated circuit (IC) design tool of claim 1, wherein
    the circuit is a standard circuit cell, and
    the design annotation software module further annotates assumptions used in the analysis together with the standard circuit cell.

4. The physical integrated circuit (IC) design tool of claim 1, wherein
    the design analysis software module performs a timing, power, yield, cost, optimization, or sensitivity analysis of a physical design of the circuit.

5. The physical integrated circuit (IC) design tool of claim 1, wherein
the design uncertainties file further includes assumptions made to include or exclude at least one of the plurality of predetermined IC design uncertainties from the analysis of the circuit by the design analysis software module.

6. The physical integrated circuit (IC) design tool of claim 5, wherein
the design uncertainties file further includes one or more methods of how each of the plurality of predetermined IC design uncertainties can be modeled by the design analysis software module to analyze the circuit.

7. The physical integrated circuit (IC) design tool of claim 1, wherein
the circuit is a functional block instantiating one or more prior analyzed standard cells having annotations of assumptions used in the design analysis of each standard cell, and
the design analysis software module checks for differences in the assumptions against how the one or more standard cells are actually used in the functional block.

8. The physical integrated circuit (IC) design tool of claim 1, wherein
the user interface software module is either a graphical user interface (GUI) software module to provide a graphical user interface or a text user interface software module to provide a text based user interface.

9. A machine-readable product comprising:
a machine readable storage device having stored therein
a file or database containing a list of possible integrated circuit (IC) design, manufacturing, and operational uncertainties;
machine readable program instructions to present the list of possible integrated circuit (IC) design, manufacturing, and operational uncertainties to a user;
machine readable program instructions to receive a user-selection of uncertainties including one or more of the possible integrated circuit (IC) design, manufacturing, and operational uncertainties from the user;
machine readable program instructions to receive a user-selection of methods of analysis for each of the selected one or more possible integrated circuit (IC) design, manufacturing, and operational uncertainties from the user; and
machine readable program instructions to perform an analysis of a design of a circuit in response to the user-selection of uncertainties including the selected one or more possible integrated circuit (IC) design, manufacturing, and operational uncertainties and the respective user-selection of the methods of analysis.

10. The machine-readable product of claim 9, wherein,
the machine readable medium further has stored therein machine readable program instructions to record and annotate to the circuit with
a) the results of the analysis;
b) the user-selection of uncertainties including the selected one or more possible integrated circuit (IC) design, manufacturing, and operational uncertainties considered in the analysis; and
c) assumptions made in the user-selection of uncertainties including the selected one or more possible integrated circuit (IC) design, manufacturing, and operational uncertainties included in the analysis.

11. A method for designing an integrated circuit, the method comprising:
reading a design of an integrated circuit from a computer readable storage device
generating a list of possible integrated circuit (IC) design, manufacturing, and operational uncertainties;
presenting the list of the possible integrated circuit (IC) design, manufacturing, and operational uncertainties to a user;
selecting, by the user, one or more of the possible integrated circuit (IC) design, manufacturing, and operational uncertainties as user-selected uncertainties under which the design of the integrated circuit is to be analyzed;
respectively selecting, by the user, an analysis method for each of the user-selected uncertainties; and
analyzing the design of the integrated circuit in response to the user-selected uncertainties and the respective user-selected analysis methods.

12. The method of claim 11, further comprising:
annotating the design of the integrated circuit with the results of the analysis, the user-selected uncertainties considered in the analysis, and the assumptions made in the selection of the user-selected uncertainties included in the analysis.

13. The method of claim 11, wherein
the analysis of the design of the integrated circuit includes one or more of a timing analysis, a power analysis, a yield analysis, a cost analysis, an optimization analysis, and a sensitivity analysis of the integrated circuit.

14. The method of claim 11, wherein
the list of the possible integrated circuit (IC) design, manufacturing, and operational uncertainties includes
lithography, semiconductor processing, etching, chemical-mechanical polishing, dopant fluctuations, placement, orientation, surrounding geometry, Intra-Chip positional, Chip-to-Chip positional, operational, voltage, temperature, and aging.

15. The method of claim 11, wherein
the selecting of one or more of possible integrated circuit (IC) design, manufacturing, and operational uncertainties includes
making an assumption to exclude at least one of the possible integrated circuit (IC) design, manufacturing, and operational uncertainties.

16. The method of claim 15, wherein
the selecting of one or more of possible integrated circuit (IC) design, manufacturing, and operational uncertainties further includes
making an assumption to include at least one of the possible integrated circuit (IC) design, manufacturing, and operational uncertainties.

17. A method for designing an integrated circuit, the method comprising:
generating a list of possible integrated circuit (IC) design, manufacturing, and operational uncertainties;
presenting the list of the possible integrated circuit (IC) design, manufacturing, and operational uncertainties to a user;
selecting one or more of the possible integrated circuit (IC) design, manufacturing, and operational uncertainties under which the integrated circuit is to be analyzed;
respectively selecting an analysis method for each of the selected possible integrated circuit (IC) design, manufacturing, and operational uncertainties;
analyzing the design of the integrated circuit in response to the selected possible integrated circuit (IC) design, manufacturing, and operational uncertainties and the respective selected analysis methods, wherein the analysis of the design of the integrated circuit includes checking differences between assumptions made for analyzing standard cells of a cell library and assumptions made for analyzing functional blocks of the design of the integrated circuit; and recording the assumptions made for analyzing the functional blocks of the design of the integrated circuit.

18. The method of claim 17, wherein
the selecting of one or more of possible integrated circuit (IC) design, manufacturing, and operational uncertainties includes
  making an assumption to exclude at least one of the possible integrated circuit (IC) design, manufacturing, and operational uncertainties.

19. The method of claim 18, wherein
the selecting of one or more of possible integrated circuit (IC) design, manufacturing, and operational uncertainties further includes
  making an assumption to include at least one of the possible integrated circuit (IC) design, manufacturing, and operational uncertainties.

* * * * *